F. HAMM.
DRAFT EQUALIZER.
APPLICATION FILED AUG. 24, 1911.
1,037,618.
Patented Sept. 3, 1912.
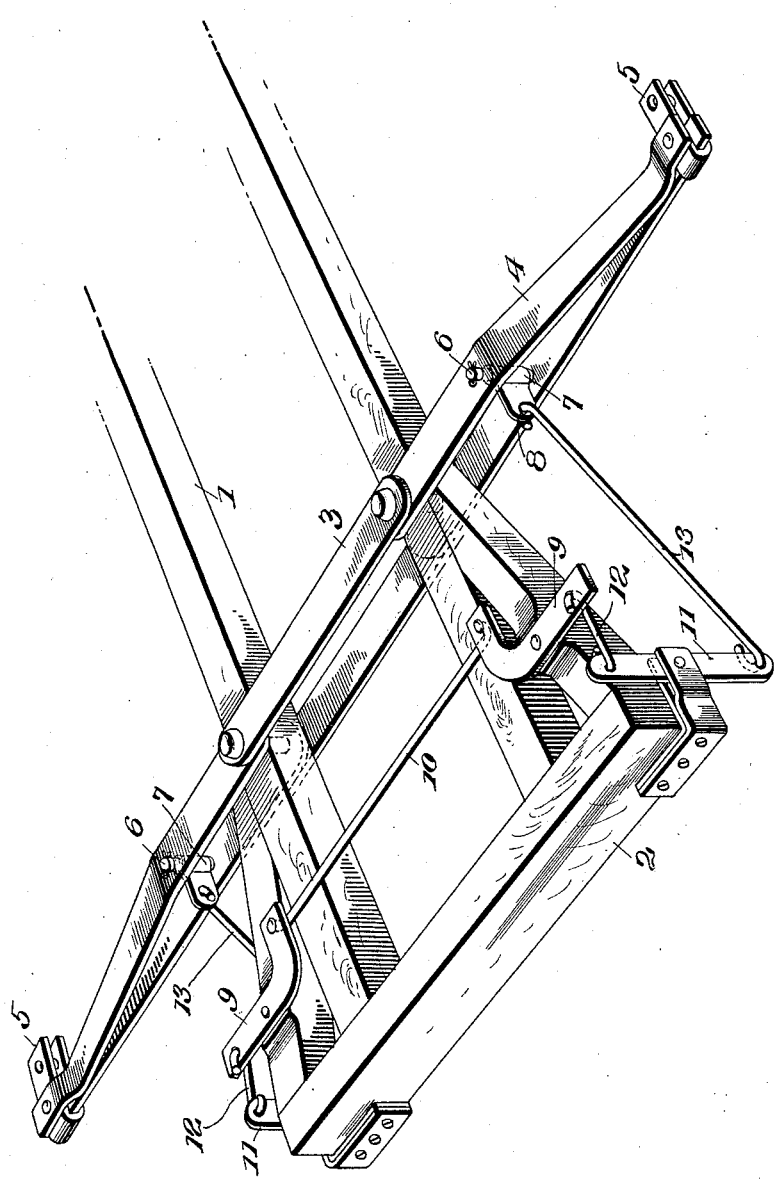

UNITED STATES PATENT OFFICE.

FRANK HAMM, OF WICHITA, KANSAS.

DRAFT-EQUALIZER.

1,037,618.  Specification of Letters Patent.  Patented Sept. 3, 1912.

Application filed August 24, 1911. Serial No. 645,738.

*To all whom it may concern:*

Be it known that I, FRANK HAMM, citizen of the United States, residing at Wichita, in the county of Sedgwick and State of Kansas, have invented certain new and useful Improvements in Draft - Equalizers, of which the following is a specification.

This invention relates to draft equalizers especially adapted to be used upon two-row cultivators, and has for its object to provide a simple structure adapted to equalize the draft from two teams of draft animals at the opposite side portions of the said cultivator.

With this object in view the equalizer includes tongues which may be connected directly to the frame of a cultivator or may be connected with a tongue frame which in turn is attached to the frame of a cultivator with bars pivoted to the said tongues and adapted to carry double-trees. Bell crank levers are pivoted at the rear portions of the tongues and are connected together by means of a link which extends transversely across the tongues. Rockers are pivoted at the rear end portions of the tongues and are operatively connected with the outer ends of the bell crank levers and are also connected with the said bars at points between their points of pivotal connection with the tongues and the supports for the double-trees.

For a full understanding of the invention reference is to be had to the following description and accompanying drawing, in which the figure is a perspective view of the equalizer.

Corresponding and like parts are referred to in the following description and indicated in all the views of the accompanying drawing by the same reference characters.

As illustrated in the accompanying drawing the tongues 1 are attached at their rear ends to a tongue frame 2 which in turn is adapted to be connected with the frame of a cultivator. Cross bars 3 are connected at their ends to the tongues 1 and the inner ends of bars 4 are pivotally connected with the said tongues at the same point at which the ends of the cross bars 3 are attached thereto. The bars 4 carry at their outer ends clips 5 to which double-trees may be attached. Pins 6 are attached to the bars 4 at points between the clips 5 and their points of pivotal connection with the tongues 1, and sleeves 7 are pivotally mounted upon the said pins for horizontal swinging movement. The said sleeves 7 carry at their rear sides eyes 8. Bell crank levers 9 are fulcrumed at the rear end portions of the tongues 1 and have forwardly disposed ends which are pivotally connected together by means of a link 10 which lies transversely across the rear end portions of the said tongues. Rockers 11 are pivoted upon the frame 2 at the rear ends of the tongues 1 and the upper ends of the said rockers are pivotally connected with the outwardly disposed ends of the bell crank levers 9 by means of links 12. Links 13 pivotally connect the lower ends of the rockers 11 with the sleeves 7 at the eyes 8 thereof.

When teams of draft animals are connected, one with each of the clips 5 at the outer ends of the bars 4, and draft strain is applied, any inequality in the draft of the two teams will cause one or the other of the bars 4 to swing their pivots, whereby the links 13 are moved longitudinally and the rockers 11 are turned and through the links 12 the bell crank levers 9 are swung. Inasmuch as these levers are connected together by the link 10 and they are pivotally mounted upon the frame 2, the combined strain of the two teams of animals will be distributed at the opposite side portions of the said tongue frame, and thus the draft is equalized, notwithstanding the fact that there is an inequality of draft between the two teams of animals.

It will be noted that the rear ends of the links 13 are connected with the lower ends of the rockers 11 and the upper ends of the rockers are connected with the bell crank levers 9 which in turn are located upon the upper portion of the frame of which the tongues 1 and part 2 are components. Therefore as the forward pulling strain is applied to the links 13 the lower ends of the rockers 11 are moved forwardly and the upper ends thereof are moved rearwardly, and through the connecting links 12 the rearward movement of the upper portions of the rockers 11 will have a tendency to lift the forward ends of the tongues 1 and thereby reduce the weight upon the necks of the draft animals.

Having thus described the invention, what is claimed as new is:

In combination with a tongue structure bars pivotally connected at their inner ends with the tongue structure, bell crank levers pivotally mounted at the rear portion of the tongue structure, a link connecting the inner ends of the bell crank levers together, rockers pivotally mounted at the rear portion of the tongue structure, links connecting the upper ends of the rockers with the outer ends of the bell crank levers, and links connecting the lower ends of the rockers with said bars.

In testimony whereof, I affix my signature in presence of two witnesses.

FRANK HAMM. [L. S.]

Witnesses:
A. J. QUIGG,
S. F. WEBB.

Copies of this patent may be obtained for five cents each, by addressing the "Commissioner of Patents, Washington, D. C."